United States Patent [19]

Shimahara et al.

[11] Patent Number: 4,867,662
[45] Date of Patent: Sep. 19, 1989

[54] SLIP CASTING MOLD

[75] Inventors: Hironobu Shimahara, Chita; Kazushige Murata; Hiroaki Takahashi, both of Tokoname, all of Japan

[73] Assignee: Inax Corporation, Japan

[21] Appl. No.: 148,594

[22] Filed: Jan. 26, 1988

[30] Foreign Application Priority Data

Jan. 29, 1987 [JP] Japan ................................. 62-19738
Feb. 18, 1987 [JP] Japan ................................. 62-36812

[51] Int. Cl.⁴ ........................ B28B 1/26; B29C 41/16
[52] U.S. Cl. ................................... 425/85; 249/66.1; 249/109; 249/113; 249/134; 249/141; 425/84; 425/437; 425/DIG. 30; 425/DIG. 119; 264/49; 264/87; 264/225; 264/344
[58] Field of Search .............. 249/58, 66 A, 105, 109, 249/113, 134, 141, 160; 425/84, 85, 470, 437, 812, DIG. 30, DIG. 37, DIG. 119; 264/49, 86, 87, 219, 225, 344

[56] References Cited

U.S. PATENT DOCUMENTS

| | | | |
|---|---|---|---|
| 3,243,860 | 4/1966 | Whittaker et al. | 425/84 |
| 3,256,219 | 6/1966 | Will | 264/41 |
| 3,859,421 | 1/1975 | Hucke | 264/44 |
| 3,929,685 | 12/1975 | Jung | 264/225 |
| 4,531,705 | 7/1985 | Nakagawa et al. | 249/134 |
| 4,727,092 | 2/1988 | Will | 521/62 |

Primary Examiner—James Housel
Attorney, Agent, or Firm—Lerner, David, Littenberg, Krumholz & Mentlik

[57] ABSTRACT

A mold (1) for cast-molding a slip is provided, which comprises a divsible casting mold including a plurality of mold portions to form a mold cavity (4) when mated together; each mold portion including an air-tight housing (2), an intermediate layer (5) of coarsely porous structure adjacent to the air-tight housing (2), and a solid synthetic resin filter layer (3) of fine open-cell structure; a slip supply duct (8) being connected with said mold cavity (4) and communicated with the outside of the air-tight housing (2); a fluid-flowing duct (9) being connected with said coarse intermediate layer (5) and communicated with the outside of the air-tight housing (2); said filter layer (3) being permeably joined to the coarse intermediate layer (5), and having substantially precise shape and dimension of substantially uniform fine open-cell structure. Such a filter layer (3) is produced by molding a flowable emulsion material comprising by weight about 100 parts of a curable synthetic resin material, about 1 to about 30 parts of a nonionic emulsifier, about 1 to about 200 parts of water, and about 50 to about 600 parts of filler particles, into a cured filter layer; and uniformly eluting with a solvent an emulsifier-based viscous substance finely dispersed in the cured resin layer, and further curing the resin layer.

12 Claims, 2 Drawing Sheets

SLIP CASTING MOLD

BACKGROUND OF THE INVENTION

1. Field of the Invention

This invention relates to a novel mold for cast-molding a slip, and a method for producing the mold. More particularly, this invention relates to the casting mold having precise dimensions, good durability, uniform deposition properties, and good demolding properties. The molds of the present invention are useful for producing cast-molded articles from a ceramic slip, for obtaining sanitary ware, pottery ware, other ceramic products, etc.

2. Prior Art

Conventional methods for casting slips comprise, for example, filling the mod cavity of a divisible gypsum mold with a slip, and depositing the slip onto the surface of the gypsum mold by the action of gypsum in absorbing water from the slip. In a mechanical cast-molding process, such operations are efficiently carried out by pressurizing the slip to promote the dehydration and deposition of the slip.

In view of durability of a casting mold, it has been known to use the casting mold composed of a porous synthetic resin. It has been needed, however, to install water-drainage conduits in such a synthetic resin mold from viewpoint of safe demolding and relatively uniform deposition, because open-cell porosity of a resin mold was usually not uniform.

In general, the defects of such synthetic resin molds have been deterioration in precise dimensions and shapes of the mold because of large curing shrinkage during production of such synthetic resin molds. In this connection, a porous epoxy resin molded product and a mold composed thereof are known, which are produced from an epoxy compound, a hardener compound, fillers, mixtures of suitable non-ionic emulsifiers, etc. (Laid-open European Patent Application No. 0194757). The Laid-open Patent Specification, however, fails to note serious problems such as formation of an emulsifier-based viscous substance hardly soluble in cool water, remaining in the preliminarily cured epoxy resin, and elution of the viscous substance with a solvent.

The present inventors have noted that formation of the uniform fine open-cell structure of cured resins is hindered in the course of curing a synthetic resin emulsion material containing a non-ionic emulsifier, because an emulsifier-based viscous substance hardly soluble in cool water remains in the cured resin and is then solidified. Incidentally, the viscous substances seem to be a dense mixture of the emulsifier and water, a reaction mixture of the emulsifier and a polymerizable material, and/or a mixture of the emulsifier and a low-polymer resin.

The present inventors have solved the above mentioned problems by substantially eluting the emulsifier-based viscous substance with a large amount of a solvent such as warm water containing an alcohol. Moreover, the present inventors have also found that installation of water-drainage conduits in the casting mold produced from an emulsifier-containing resin material should be avoided, because a solvent for eluting the emulsifier based viscous substance is apt to flow towards the conduits and thus the non-uniform elution of the viscous substance results in non-uniform open-cell structures of the synthetic resin mold.

SUMMARY OF THE INVENTION

It is an object of the present invention to provide a mold for casting a slip having uniformly fine open-cell structures, precise dimensions, good durability, uniform deposition properties, and good demolding properties.

It is another object of the present invention to provide a method for effectively producing the casting mold.

Other objects, features and advantages of the present invention will be apparent from the following description and drawings.

The present inventors have found that a filter layer having substantially uniform fine open-cell pores is obtained by molding a synthetic resin emulsion material into a resin layer having no water-drainage conduits therein and having no sudden change in thickness (preferably having no substantial change in thickness), and uniformly eluting or dissolving out an emulsifier-based viscous substance. Thus, a mold for casting a slip having precise dimensions, good durability, uniform deposition properties, and good demolding properties is obtained by applying a coarse fluid-flowing layer adjacent to the resin filter layer.

In accordance with the present invention there is provided a mold for cast-molding a slip which comprises a divisible casting mold including a plurality of mold portions to form a mold cavity when mated together; each mold portion including an air-tight housing, an intermediate layer of coarsely porous structure adjacent to the air-tight housing, and a solid synthetic resin filter layer of fine open-cell structure; a slip supply duct being connected with said mold cavity and communicated with the outside of the air-tight housing; a fluid-flowing duct being connected with said coarse intermediate layer and communicated with the outside of the air-tight housing; said filter layer being permeably joined to the coarse intermediate layer, and having substantially precise shape and dimension of substantially uniform fine open-cell structure; said precise shape and dimension of the filter layer being achieved by molding a flowable emulsion material comprising by weight about 100 parts of a curable synthetic resin material, about 1 to about 30 parts of a non-ionic emulsifier, about 1 to about 200 parts of water (which may contain a dispersing agent such as a surfactant), and about 50 to about 600 parts of filler particles, into a cured filter layer; said uniform fine open-cell structure of the filter layer being achieved by uniformly eluting with a solvent an emulsifier-based viscous substance finely dispersed in the cured resin layer and further curing the resin layer; whereby said filter layer being provided with the functions of uniformly draining water, depressurizing, and supplying water and air by the aid of the coarse intermediate layer and the fluid-flowing duct connected therewith.

There is also provided a method for producing a divisible mold for cast-molding a slip including a plurality of mold portions to form mold cavity when mated together: which method comprises force-filling a molding space composed by a divided airtight housing and a model for a coarse intermediate layer, with a mixture consisting essentially of a large quantity of aggregate particles and an adhesive synthetic resin material in an amount sufficient to partly bond the aggregate particles, to form an intermediate layer of coarsely porous structure bonded to the airtight housing;

cast-filling a molding space composed by the resulting coarse intermediate layer and a model for a filter layer having the shape of a desired slip-molding article, with a flowabe emulsion material comprising by weight about 100 parts of a curable synthetic resin material, about 1 to about 30 parts of a non-ionic emulsifier, about 1 to about 200 parts of water, and about 50 to about 600 parts of filler particles, to form a cured synthetic resin filter layer having substantially precise shape and dimension; and then uniformly eluting with a solvent an emulsifier-based viscous substance finely dispersed in the cured resin layer and further curing the resin layer, to form a filter layer of substantially uniform fine open cell structure permeably joined to the coarse intermediate layer.

DETAILED DESCRIPTION OF THE INVENTION

Figure 1:
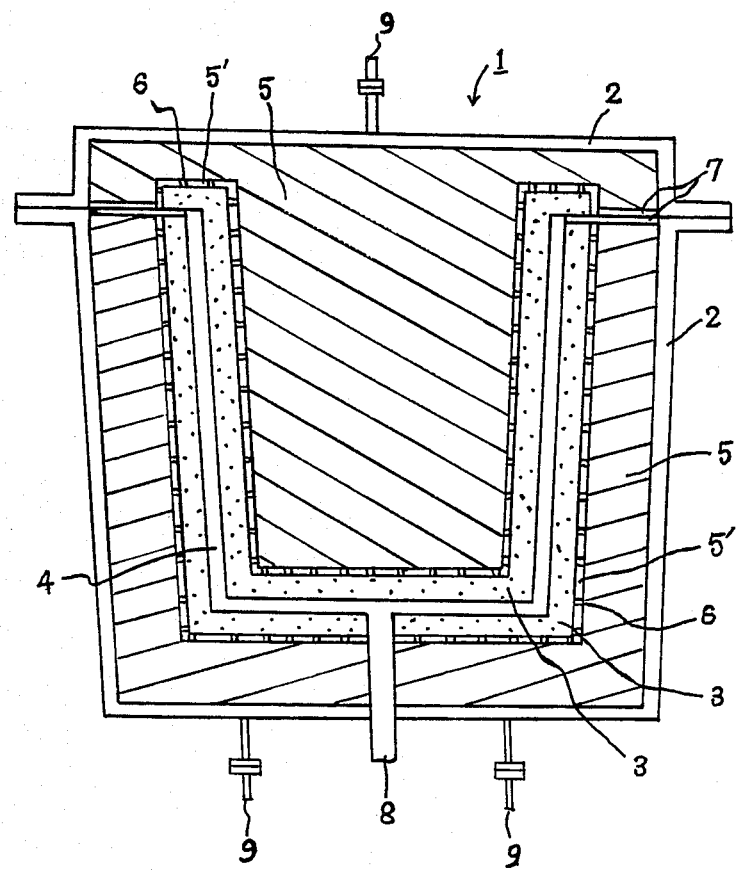
FIG. 1 is a schematic sectional view showing a slip-casting mold according to the present invention.

The above mentioned filter layer penetrates into the coarsely porous surface of the coarse intermediate layer, and is permeably resin-bonded via a substantially porous interface to the intermediate layer. The present filter layer, produced by molding a synthetic resin emulsion material and eluting an emulsifier-based viscous substance with a solvent, has uniform open-cell fine pores, satisfactory mechanical strength, dimensional stability, and strong resinous adhesion. Thus, the present casting mold does not need a complicated anchoring means for the both layers which causes non-uniform permeability or hinders permeation between the filter layer and the coarse intermediate layer, such as anchoring via a wedge-like convex-concave interface, anchoring by embedding metal pieces, or non-permeable bonding with an adhesive. Also, it is perferred that the filter layer of the present casting mold has no sudden change in its thickness, with moderate change in thickness as necessary, so that the emulsifier-based viscous substance can be uniformly eluted to form uniform open-cell pore structures.

The above mentioned housings for the mold include, for example, a divisible air-tight vessel, a housing means comprising a plate-like or vessel-like portion and a sealed portion coated with a paint or resin material, etc.

The above mentioned solvent for eluting the emulsifier-based viscous substance can be a solvent which dissolves the viscous substance and does not affect the cured resin and mold members. Normally, there can be used warm water at about 35° to about 80° C. and preferably warm water containing a lower alcohol (e.g. having 1 to 4 carbon atoms). The elution of the viscous substance can be carried out by flowing a considerably large amount of the solvent through the preliminarily cured filter layer, for example, for about 1 hour to several tens of hours.

The above mentioned non-ionic emulsifier can be used alone. It is generally desirable, however, to use two or more types of non-ionic emulsifiers having different HLB (i.e. hydrophilic-lipophilic balance) values. More specifically, in the combination of two emulsifiers, it is desirable that the quantity of one emulsifer is not less than about 5% by weight and preferably not less than about 10%, the quantity of the other emulsifier being not more than about 95%. When three or more types of emulsifiers are used, the quantities of two emulsifiers are as mentioned above. The quantity of the other emulsifier(s) of the three or more emulsifiers is not especially restricted, but is desirably not less than about 5% by weight. Moreover, the sum of the HLB values of the emulsifiers, when they are mixed, is desirably in the range of about 7 to 16.5, preferably about 8 to 16, and typically about 12 to 15. When one non-ionic emulsifier is used alone, it is also desirable that the HLB value of the emulsifier is in the above mentioned range.

The present invention is further described with reference to Drawinqs.

(1) Mold For Casting Slip

As shown in FIG. 1, the casting mold 1 of the present invention is a divisible casting mold consisting essentially of an air-tight housing 2, a coarse intermediate layer (5 and/or 5') and a filter layer 3 adjacent to the intermediate layer. Thus, a mold cavity 4 is formed inside the filter layers 3. A slip supply duct 8 is connected with the mold cavity 4, and a fluid-flowing duct 9 is connected with the intermediate layer (5 or 5'). Onto the divisible boundary portions of the intermediate layers are applied sealing means 7 (43 in FIG. 3) such as (a) plastic or metal plates, (b) adhesive tapes or (c) coating of sealing materials, whereby each mold portion can be subjected to suction or pressurization independently.

The coarse intermediate layer, which gas and liquid can pass through, desirably comprises (a) both an interstructure wall 5' having many pores 6 (e.g. a few mm in diameter) and a coarsely porous solid member (or layer) 5 adjacent to the wall 5' as shown in FIG. 1, or (b) a coarsely porous solid member (or layer) 5 adjacent to the filter layer 3 wherein the interstructure wall 5' mentioned above is omitted. It is also possible, however, to omit the coarsely porous solid member 5 in the above mentioned embodiment (a). In this case, it is necessary to install a fluid-flowing duct 9 at a water-drainable position (e.g. at a gravitationally low position), because the space where the porous solid member 5 as shown in FIG. 1 is omitted is hollow.

The casting mold shown in FIG. 1 is generally for molding a solid (i.e. not hollow) slip-cast article. A hollow cast article, however, can be readily obtained by using such a casting mold having a thick space of the mold cavity 4. Incidentally, the hollow molded articles can be produced by filling the mold cavity with a slip, depositing the slip onto the filter layer to the thickness of about 10 mm, and then draining the remaining slip away, which can be further described with reference to FIGS. 2 and 3.

(2) Molding Materials for the Filter Layer

The synthetic resin material for producing the present filter layer can be a flowable synthetic resin material which can be cured into a hardened synthetic resin of porous open-cell structure. The flowability can be obtained by emulsifying the resin material.

The useful resin materials include, for example, an epoxy resin, a phenolic resin, a rigid urethane resin, a polyester resin, a furan resin, an acrylic resin, etc.

Typically, the present invention is further explained in the following with respect to the use of an epoxy resin emulsion material.

(3) Epoxy Resin for Filter Layers (Illustration)

The filler-containing epoxy resin filter layer preferably used in the present invention is effectively obtained by molding a molding material which contains an epoxy compound having one or more epoxy groups in each molecule, a hardener compound which is cured with the epoxy compound, an emulsifier comprising preferably two or more types of non-ionic emulsifiers selected from three or more types of non-ionic emulsifiers having HLB values of about 4~8, about 8~17 and about 11~15.6, respectively, water or a water-surface active agent mixture, and filler particles; wherein said molding material comprises by weight about 100 parts of a mixture of an epoxy compound and a hardener compound therefor, about 30 parts or less, e.g. about 1 to about 30 parts (preferably about 5 to about 30 parts) of non-ionic emulsifiers, about 1 to about 200 parts (usually about 10 to about 80 parts) of water, and about 50 to about 600 parts of filler particles; and then eluting the emulsifier-based viscous material with a solvent. Incidentally, the quantity of the hardener compound is generally in the range of about 20 to about 50 parts by weight to 100 parts by weight of the epoxy compound.

(3)(a) Epoxy Compound (Illustration)

An epoxy compound having one or more epoxy groups in one molecule is used in the present invention. As the epoxy compound, a diglycidyl ether of bisphenol A type or of bisphenol F type is generally preferred. In the case where filter layers having high resistance to chemicals and heat are required, it is advisable to use a polyfunctional epoxy resin such as polyglycidyl ether derived from phenolic novolak or from cresol novolak or triglycidyl ether of trimethylol propane (TMp); glycidyl ester derived from acid anhydrides such as vinylcyclohexane dioxide, tetrahydro-phthalic anhydride (THPA); and hexahydro-phthalic acid (HHPA); or an alicyclic epoxy resin such as hydantoin based-epoxy resin. For the epoxy compound to be used as a viscosity modifier, mono- or di-glycidyl ether or ester, namely, fatty glycidyl ethers represented by butyl glycidyl ether (BGE), aromatic glycidyl ether such as cresyl glycidyl ether (CGE), phenyl glycidyl ether; glycidyl ethers derived from higher alcohols and glycols, and glycidyl esters derived from fatty acid can be used.

Such epoxy compound may be used alone or in combination of two or more as necessary.

(3)(b) Hardener Compound (Illustration)

The hardener compounds for the epoxy resin include, for example, aliphatic polyamines such as diethylene triamine (DETA), triethylene tetraamine (TETA), m-xylylene diamine (m-XDA) and trimethyl hexamethylene diamine (TMD); alicyclic polyamines such as isophorone diamine (IPD), N-aminoethyl piperazine and imidazole compound; aromatic polyamines such as di-aminodiphenyl methane (DDM), diamino-diphenyl sulfone (DADPS) and phenylenediamine; polyamides such as the condensates of basic acid and polyamine; and the like. Such compounds may be used alone or in combination, as required. In addition, for the hardener, polymers, condensates, or reaction products of at least one of the above mentioned compounds with at least one of formalin, acrylic acid, polyols, phenols, polyesters, oxides, mono-, di- or polyglycidyl ether can be used. Among them, preferred hardeners are reaction products of the above mentioned amine or amide or a mixture thereof with glycidyl ether or polyphenol, or polycondensates thereof with a basic acid or formalin. Other suitable hardeners include reaction products of an aliphatic polyamine, a glycidyl ether and a polyphenol; reaction products of an aliphatic polyamine, an aromatic polyamine, a glycidyl ether and a polyphenol; and reaction products of a dicyandiamide, an aliphatic polyamine, a glycidyl ether, and a polyphenol.

(3) (c) Preferable emulsifiers

In order to obtain a filter layer having uniform porosity and excellent dimensional stability and mechanical strength, it is preferred to use at least two types of three kinds of non-ionic emulsifiers having HLB values of 4–8, 8–17, and 11–15.6, respectively. Preferred emulsifiers having 4–8 HLB include sorbitan aliphatic acid esters, those having 8–17 HLB include polyoxyethylene oleyl ethers, and those having 11–15.6 HLB include polyoxyethylene sorbitan aliphatic acid esters. It is desired that at least two types of these emulsifiers are used together, and it is preferable to use three types of the emulsifiers having HLB values of 4–8, 8–17, and 1114 15.6, respectively. It is more preferable to use a mixture of a sorbitan aliphatic acid ester, a polyoxyethylene oleyl ether, and a polyoxyethylene sorbitan aliphatic acid ester.

Particularly in the case of epoxy resin systems, the emulsifier is preferably such that it can be added to one or both of the epoxy compound and the hardener compound. It is desirable that the emulsifier is excellent in storage stability even when it coexists with the epoxy compound and/or hardener.

(3) (d) Filler Particles

The type, particle size and quantity of the filler are factors which greatly affect the characteristics of the filter layers besides the quantity of water to be added. The type of the fillers used in the invention is not particularly restricted as long as they are usually used for synthetic resins. For example, silica sand, calcium carbonate, talc, barium sulfate, clay, aluminum hydroxide, and pigments such as titanium oxides and chromium oxides can be used. Also, dolomite and ceramic powder may be used. Non-organic fillers such as alumina, glass beads, pearl sand, and Ottawa sand, and organic fillers such as spherical particles of phenolic resin and epoxy resin may also be used. It is preferable that the filler has a certain particle size range such as 60–100 mesh, 100–200 mesh, 200–300 mesh or smaller than 300 mesh, and has substantially spherical or similar shape. In the case where a filter layer having accurate pore diameter and porosity is to be made, such product can be obtained by using a filler having a certain particle size range and spherical or similar shape alone or in combination. The preferred amount of the filler to be added is about 30 to about 80% by weight of the total amount of a molding material.

(3) (e) Molding of the Material

The materials as described above are mixed together to give an emulsified resin material to be used for molding.

In order to break the bubbles formed upon stirring the molding material, a defoaming agent having defoaming or foam breaking action is added as necessary.

Filter layer can be made, for example, by casting the above mentioned molding material, gelling and then heating it to dehydrate and simultaneously cure the material, then eluting an emulsifier-based viscous substance with a solvent, and further curing the molded product.

Such a filter layer made from the above described materials can be produced by casting method, and has uniform fine open-cell structure, and excellent dimensional stability, mechanical properties, durability, etc. Moreover, it is possible to obtain a filter layer having accurate pore diameter and porosity by selecting the amount of water and the type of the filler. Also, by selecting a hardener, gelling time of the molding material can be reduced to shorten the processing time.

(4) Filter Layer

The filter layer 3 thus obtained is required to have a smooth surface and also to have fine open-cell structure that enables filtration and deposition of a slip. The diameter of the fine pores of the layer is suitably in the range of, for example, about 2 to about 60 microns. The thickness of the filter layer is at least about 0.5 mm or more, and preferably in the range of about 10 to about 50 mm or more. When the thickness is less than about 5 mm, such a filter layer can be readily formed by known methods such as trowelling, brushing, spraying, flow casting, doctor blade coating, etc. instead of the cast molding.

(5) Intermediate Layer of Coarsely Porous Solid Materials

· The material of the coarsely porous solid layer 5 for the intermediate layer having coarsely porous structure is not particularly restricted as long as it has such open-cell structure that enables easy draining, suction and air-pressurization. In view of feasibility of molding, however, the material is preferably an aggregate/resin solid material comprising a large amount of aggregate (e.g. about 80 to 90 parts by weight) and a small amount of a synthetic resin (e.g. about 20 to 10 parts by weight) sufficient to partly bond the aggregate. The aggregate is exemplified by mixtures (particle size approximately 500 to 5000 microns) of usual aggregate (e.g. silica sand, calcium carbonate, white marble, etc.) and lightweight aggregate (e.g. volcanic balloon, felite, pumice stone, alumina grit, etc.). As the adhesive synthetic resin material, any adhesive resin material can be used as long as it is water-insoluble when adhesion-cured; such resin materials include epoxy resins, phenolic resins, urethane resins, acrylic resins, etc. Molding of the coarsely porous solid layer can be readily carried out by kneading the aggregate and resin material, and then, for example, forcing the resulting mixture into a mold having a predetermined shape to cure the resin material.

The diameter of the coarse pores of the coarsely porous solid layer 5 is suitably in the range of, for example, about 80 to bout 1000 microns. The thickness of the solid layer is at least about 5 mm or more, and preferably about 30 to about 100 mm. The thickness of the layer may be changed part by part as necessary.

(6) Production of a Mold Cast Molding

In the following, described is an example of producing a lower mold portion of a mold for cast molding having a shape as illustrated in FIG. 1, wherein an interstructure wall 5' is omitted.

(6) (a) Production of Coarsely Porous Solid Layer

A model having a convex shape to be surrounded by the solid layer 5 of the lower mold portion as illustrated in FIG. 1 is prepared. A releasing agent is applied onto the surface of the model. The model is placed upside-down (namely in a convex configuration), and then an air-tight housing, e.g. a vessel 2, is placed upside-down over the model. The upper part of the vessel is opened for filling. The mold space for the coarse solid layer 5 thus formed between them is force-filled with an aggregate/epoxy resin mixture material as described below. The mixture material is allowed to stand for curing the resin component. After curing, the model is removed to give a coarse solid layer 5. Incidentally, the aggregate/resin mixture material consists essentially by weight of, for example, 80 parts of pumice stone, 10 parts of calcium carbonate, and 10 parts of a commercially available epoxy compound/hardener compound resinous liquid.

(6) (b) Production of a Filter Layer of Fine Open-cell Structure

A convex-shaped model to be surrounded by a filter layer 3 of the lower mold portion as illustrated in FIG. 1 is produced, and the surface of the model is treated with a releasing agent. The model is placed upside-down (namely in a convex configuration), and then the solid layer produced in (6) (a) above is placed upside-down over the model. An epoxy resin/filler molding material as described below is poured into the molding space for the filter layer 3 thus formed between them, and is allowed to stand to preliminarily cure the molding material. Then the model is removed, and an emulsifier-based viscous substance is eluted with a large amount of warm water containing an alcohol (e.g. isopropyl alcohol). Thus, there is obtained a lower mold portion for cast molding which substantially comprises an air-tight housing such as vessel 2, a coarasely porous solid intermediate layer 5 and a filter layer 3. Incidentally, a slip supply duct 8, a fluid flowing duct 9, sealing means 7 and the like can be readily installed in the above mentioned process. The upper mold portion of the mold as illustrated in FIG. 1 can be similarly produced.

Incidentally, the above resin-based molding material has, for example, the following composition.

| | |
|---|---|
| Epoxy compound | 100 parts by weight |
| [a mixture of 85% by weight of EPICOAT (supplied by Yuka-Shell Epoxy K.K., Japan) and 15% by weight of EPONIT 028 (supplied by Nitto Kasei K.K., Japan)] | |
| Emulsifier | |
| Sorbitan fatty acid ester | 8 parts by weight |
| Polyoxyethylene oleyl ether | 8 parts by weight |
| Polyoxyethylene sorbitan fatty acid ester | 8 parts by weight |
| Hardener compound | 30 parts by weight |
| [modified aliphatic polyamine obtained by reacting 50% by weight of aliphatic polyamine, 30% by weight of glycidyl ether and 20% by weight of polyphenol] | |
| Filler (ceramic powder) | 220 parts by weight |
| Water | 50 parts by weight |

(7) Use of the Casting Mold (I)

Figure 2:
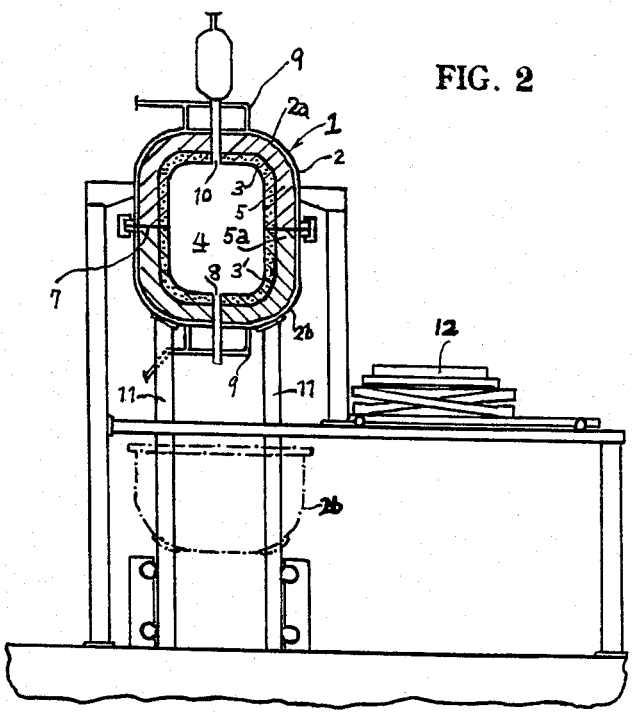
FIG. 2 is a schematic view showing a section of a slip-casting mold and an apparatus for cast-molding a slip, according to the present invention.

The mold 1 in FIG. 2 shows an embodiment of the present casting mold. As shown in FIG. 2, the casting mold 1 comprises an upper mold portion 2a and a lower mold portion 2b, wherein filter layers 3, 3' are installed inside a divisible air-tight vessel 2, and coarse intermediate layers 5, 5a are installed outside the filter layers 3, 3', respectively. A mold cavity 4 is formed inside the filter layers. At least one end of each intermediate layer 5, 5a leads to the outside of the vessel 2 and is communicated with atmospheric pressure or a depressurization source. The upper mold portion 2a is equipped with an overflow tank and duct 10 which are communicated with the mold cavity 4 through the filter layer. The lower mold portion 2b is equipped with a slip supply duct 8 which is communicated with the mold cavity 4 through the filter layer 3'. The lower mold portion 2b is movably supported upward and downward by supporting members 11. A wagon for receiving a cast-molded article is installed between the moving positions of the lower mold portion 2b.

The cast molding is carried out in the following way. A slip is supplied via the slip supply duct 8 into the mold cavity 4 until the slip flows into the overflow tank. The slip in the mold cavity 4 is pressurized by sending compressed air into the overflow tank and the coarse intermediate layers 5, 5a are communicated depressurization source, whereby the deposition velocity of the slip onto the filter layers 3, 3' as well as the diffusion velocity of water contained in the deposited slip are enhanced. When the deposited slip on the filter layers 3, 3' reaches a predetermined thickness, the pressure within the overflow tank is turned to atmospheric pressure and the remaining slip in the mold cavity 4 is drained via the slip supply duct, whereby a hollow molded article is produced.

Then, the intermediate layer 5a is pressurized by sending compressed air to an air-water separator located under the lower mold portion 2b to exude some water remaining in the filter layer 3' onto the interface between the filter layer 3' and the molded article. Thus, water membrane is formed between them and the lower mold portion is readily demolded. The molded article is attracted in vacuum into the upper mold portion 2a and hung therefrom. A receiving wagon 12 is placed under the molded article. Water membrane is formed on the interface between the molded article and the filter layer 3 of the upper mold portion 2a as described above, and the molded article is demolded on the wagon 12.

(8) Use of the Casting Mold (II)

Figure 3:
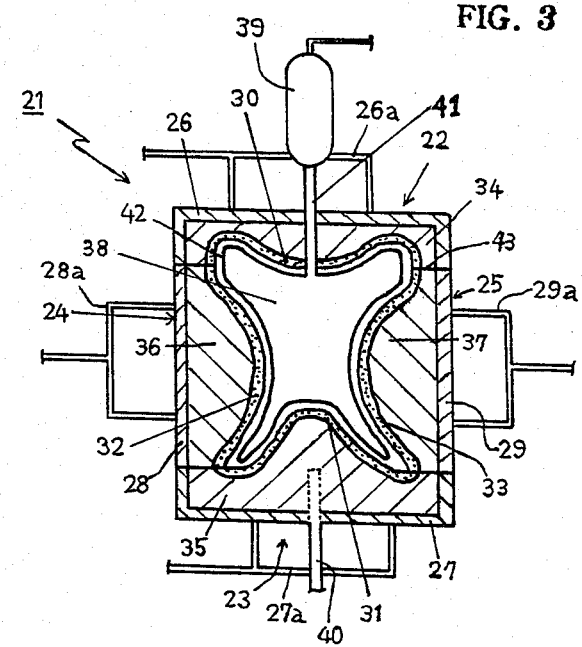
FIG. 3 is a schematic sectional view showing another slip-casting mold according to the present invention.

The mold 21 in FIG. 3 shows another embodiment of the present casting mold. As shown in FIG. 3, the casting mold 21 comprises air-tight vessels 26 through 29, filter layers 30 through 33 inside of the vessels, and coarse intermediate layers 34 through 37 between the filter layers and the vessels. At least one end each of the intermediate layers leads to the outsides of the vessels 26 through 29, and is communicated via fluid flowing ducts 26a through 29a with atmospheric pressure or a depressurization source, respectively. A mold cavity 38 is formed inside the filter layers 30 through 33. The upper mold portion 22 is equipped with an overflow tank 39 and duct 41 which are communicated with the mold cavity 38 through the filter layer 30. The lower mold portion 23 is equipped with a slip supply duct 40 which is communicated with the mold cavity 38 through the filter layer 31.

The cast molding is carried out in the following way. A slip is supplied via the slip supply duct 40 into the mold cavity 38 until the slip flows into the overflow tank 39. The slip in the mold cavity 38 is pressurized by sending compressed air into the overflow tank (or by pressurizing the slip supply duct), and the coarse intermediate layers 34 through 37 are communicated with atmospheric pressure or a depressurization source. Thus, the deposition velocity of the slip onto the filter layers 30 through 33 as well as the diffusion velocity of water contained in the deposited slip are enhanced. The overflow tank 39 is then communicated with atmospheric pressure and the remaining slip is drained via the slip supply duct to produce a hollow molded article 42.

Then, the intermediate layers 34, 35 of the upper and lower mold portions 22, 23 are pressurized to exude some water remaining in the filter layers 30, 31 onto the interface between the molded article 42 and the filter layers. Thus water membrane is formed between them and attraction between the molded article 42 and the upper and lower mold portions 22, 23 are loosened, whereby the molded article is readily demolded. The whole side surfaces of the molded article 42 are supported and suspended by side mold portions 24, 25, preferably by communicating the side mold portions with a depressurization source, and the upper and lower mold portions 22, 23 are removed. In this state, the molded article does not suffer from shrinking deformation, cracking and partial fracture owing to its weight, because the whole side surfaces thereof are supported by the side mold portions 24, 25. A receiving stand is placed under the molded article 42. Water membrane is formed on the interface between the molded article 42 and the filter layers 32, 33 by pressurizing the coarse intermediate layers 36, 37 of the side mold portions 24, 25 to exude some water remaining in the filter layer 32, 33, whereby demolding can be readily conducted. The side mold portions 24, 25 are removed to demold the molded article 42 on the stand.

(9) Performances of the Casting Mold

The casting mold of the present invention is quite satisfactory with respect to precise dimensions, uniform deposition properties and demolding properties. As to the durability of the mold, it has been expected to be durable for more than 20,000 cycles of cast molding.

(10) Preferred Filler Particles

In addition to the filler particles described in the paragraph (3) (d) above, the present inventors have found that water-insoluble filler particles of a hydrophilic thermoplastic resin are especially preferred for the performances of the present filter layer. Because of thermoplastic properties, filler particles having substantially spherical shapes and smooth surfaces, which are very suitable in the present invention, are readily obtained. Also, the specific gravity of such resins are substantially the same as the emulsified resin materials.

Thus, the following characteristics are exhibited by the use of such hydrophilic resin fillers: (a) a larger amount of fillers can be incorporated in the emulsified resin material, and the resulting mixture is more flowable, (b) more uniform porosity and pore sizes are readily obtained, (c) larger degree of porosity and smaller pore sizes of the filter layer are readily obtained, (d) a hydophilic filter layer is obtained; whereby molding of the filter layer is readily carried out, and more uniform deposition properties and better demolding properties of the filter layer are realized. For example, water permeability of the filter layer containing such hydrophilic fillers is at least twice and generally more than 5 times the filter layer of the similar structures containing hydrophobic fillers. Such effects can be obtained when filler particles comprise about 30% by weight or more of the hydrophilic resin particles of substantially spherical shapes.

Incidentally, such hydrophilic thermoplastic resins include, for example, acrylic (e.g. methacryl or acryl) resins, polyamide resins, vinyl acetate copolymer resins, cellulose acetate resins, modified resins derived therefrom, etc. Methyl methacrylate resin is typically used.

ACTIONS AND EFFECTS OF THE INVENTION

As described in the paragraphs of "Prior Art", "Summary of the Invention" and others, the present invention has been accomplished by (a) substantially solving the problem of curing shrinkage upon producing a synthetic resin filter layer by the use of a resinous emulsion material, (b) substantially solving the problem of an emulsifier-based viscous substance remaining in the filter layer by the use of a filter layer having no water-drainage conduits and elution of the substance with a solvent, and (c) substantially solving other problems by using a resinous filter layer having no sudden change in the thickness thereof and by permeably resin-bonding the filter layer to a coarsely porous intermediate layer. By the combination of the above mentioned factors (a), (b) and (c), the present casting mold is provided with precise dimensions, good durability, uniform deposition properties, good demolding properties, etc.

What is claimed is:

1. A mold for cast-molding a slip, said mold including a plurality of mold portions forming a mold cavity when mated together, each mold portion including an air-tight housing, an intermediate layer of coarsely porous structure adjacent to the air-tight housing, and a solid synthetic resin filter layer of fine open-cell structure, a slip supply duct connected with said mold cavity and communicating with the outside of the air-tight housing, a fluid-flowing duct connecting with said coarse intermediate layer and communicating with the outside of the air-tight housing, said resin filter layer penetrating into and permeably joined to the coarse intermediate layer and having a substantially precise shape and dimension defining a substantially uniform fine open-cell structure substantially free of emulsifier-based viscous substances.

2. The mold according to claim 1, in which the resin filter layer is of substantially uniform thickness.

3. The mold according to claim 1, in which the fluid-flowing duct is communicated with means for suction and pressurization of said fluid-flowing duct located outside of the air-tight housing.

4. The mold according to claim 1, in which the synthetic resin material for the filter layer is selected from the group consisting of an epoxy resin, a phenolic resin, a furan resin, a rigid urethane resin, a polyester resin, and an acrylic resin.

5. The mold according to claim 1, in which the filler particles comprise substantially spherical filler particles of a hydrophilic thermoplastic synthetic resin.

6. The mold according to claim 1, in which said resin filter layer is free of any drainage conduits.

7. A slip-casting mold comprising a plurality of mold portions forming a mold cavity when mated together, each mold portion comprising an air-tight housing, an intermediate layer of coarsely porous structure adjacent to the air-tight housing, a solid synthetic resin filter layer of fine open-cell structure, a slip supply duct connecting with said mold cavity and communicating with the outside of said air-tight housing, and a fluid flowing duct connected with said coarse intermediate layer and communicating with the outside of said air-tight housing, said resin filter layer penetrating into and permeably joined to the coarse intermediate layer and having a substantially precise shape and dimension defining a structure of substantially uniform fine open cells substantially free of emulsifier-based viscous substances, prepared according to a process comprising the steps of:

bonding said intermediate layer of coarsely porous structure to said air-tight housing by force-filling a molding space defined between said air-tight housing and a model for said coarse intermediate layer with a mixture consisting essentially of aggregate particles and an adhesive synthetic resin material in an amount sufficient to partly bond said aggregate particles;

forming said synthetic resin filter layer by casting a molding space defined between said coarse intermediate layer and a model for said resin filter layer having the shape of a desired slip-molded article, with a flowable emulsion material comprising by weight about 100 parts of a curable synthetic resin material, about 1 to about 30 parts of a non-ionic emulsifier, about 1 to about 200 parts of water, and about 50 to about 600 parts of filler particles;

forming said resin filter layer structure of substantially uniform fine open cells by uniformly eluting said resin filter layer with a solvent to substantially remove the emulsifier-based substances from said resin filter layer; and further curing said resin filter layer.

8. The mold prepared according to the process of claim 7, in which said resin filter layer is free of any drainage conduits.

9. The mold prepared according to the process of claim 7, in which the non-ionic emulsifier comprises at least two non-ionic emulsifiers having different HLB values.

10. The mold prepared according to the process of claim 9, in which the quantity of each non-ionic emulsifier is not less than about 5% by weight of the total amount of the non-ionic emulsifiers 11. The mold prepared according to the process of claim 7, in which the solvent for eluting the emulsifier-based viscous substance comprises warm water.

12. The mold prepared according to the process of claim 11, in which the solvent comprises warm water containing a lower alcohol.

* * * * *

UNITED STATES PATENT AND TRADEMARK OFFICE
CERTIFICATE OF CORRECTION

PATENT NO. : 4,867,662

DATED : September 19, 1989

INVENTOR(S) : Shimahara et al.

It is certified that error appears in the above-identified patent and that said Letters Patent is hereby corrected as shown below:

On the title page in the listing of inventors, "Chita" should read --Chita-gun--.
Column 1, line 18, "mod" should read --mold--.
Column 6, lines 25-26, "1114 15.6" should read --11-15.6--.
Column 7, line 64, after "a Mold" insert --for--.
Column 9, line 23, after "are communicated" insert --with atmospheric pressure or a--.
Column 11, line 40, "connected" should read --connecting--.

Signed and Sealed this

Eighteenth Day of September, 1990

Attest:

HARRY F. MANBECK, JR.

Attesting Officer     Commissioner of Patents and Trademarks